United States Patent [19]
Priero

[11] Patent Number: 5,937,998
[45] Date of Patent: Aug. 17, 1999

[54] DEVICE FOR THE SUSPENDED TRANSPORT OF CONTAINERS POSSESSING PROTRUDING COLLARS

[75] Inventor: Marco Priero, Fidenza, Italy

[73] Assignee: Europool S.R.L., Parma, Italy

[21] Appl. No.: 09/048,503

[22] Filed: Feb. 24, 1998

Related U.S. Application Data

[63] Continuation of application No. PCT/IT95/00146, Sep. 5, 1995.

[51] Int. Cl.⁶ ..................................................... B65G 17/32
[52] U.S. Cl. ......................... 198/681; 198/678.1; 198/817
[58] Field of Search .............................. 198/485.1, 486.1, 198/678.1, 817, 681

[56] References Cited

U.S. PATENT DOCUMENTS

| | | | |
|---|---|---|---|
| 2,868,354 | 1/1959 | Harrison | 198/486.1 |
| 3,934,993 | 1/1976 | Bowman . | |
| 4,705,159 | 11/1987 | Feliks et al. | 198/817 |
| 4,802,571 | 2/1989 | Born et al. | 198/817 |
| 5,145,055 | 9/1992 | Kondo | 198/817 |
| 5,353,908 | 10/1994 | Wihlidal . | |

FOREIGN PATENT DOCUMENTS 0 466 278  1/1992  European Pat. Off. .

*Primary Examiner*—Joseph E. Valenza
*Attorney, Agent, or Firm*—Darby & Darby

[57] ABSTRACT

The device belongs to the category of transporting devices and refers to a transporter for containers possessing protruding collars and moved by means of suspension from the neck in which pulling elements are connected with driving elements in such a way that the active marginal extremity of the said pulling elements on which the protruding collars of the container rests in order to be pulled along, whose motion describes a path which is substantially identical even in curved sections, to that described by the driving elements, having substantially the same curvature and moving through a movement plain different from that of the driving elements.

7 Claims, 2 Drawing Sheets

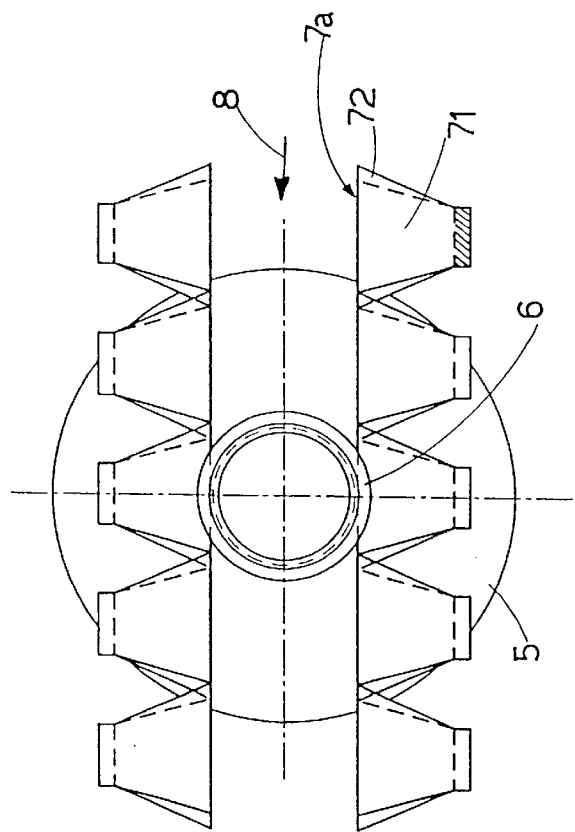
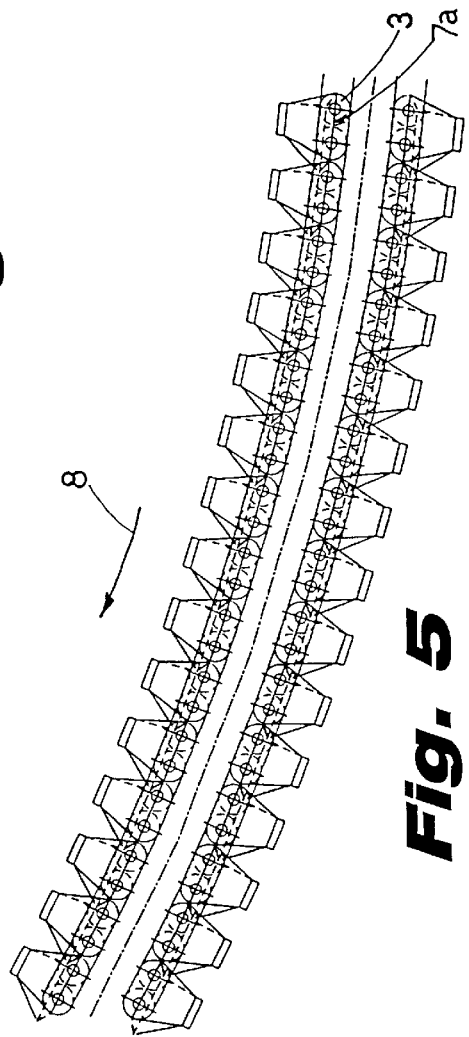
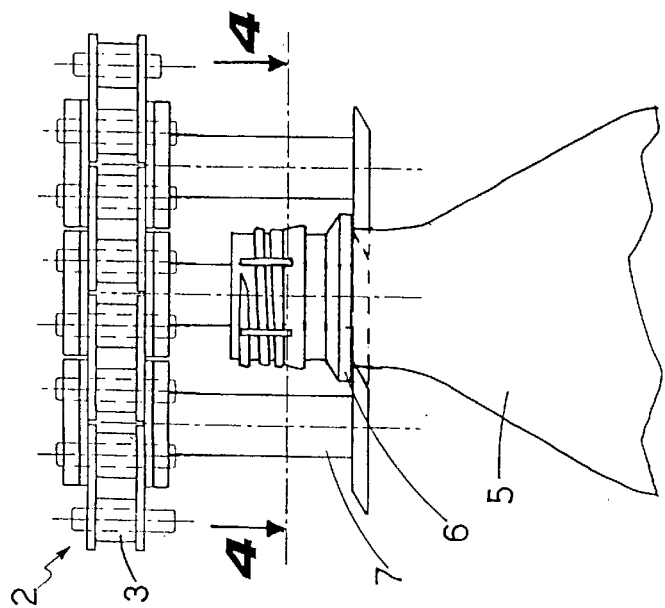

DEVICE FOR THE SUSPENDED TRANSPORT OF CONTAINERS POSSESSING PROTRUDING COLLARS

BACKGROUND OF THE INVENTION

This is a continuation application of International PCT Application No. PCT/IT95/00146, filed Sep. 5, 1995.

The object of the present invention is a device capable of transporting containers with protruding collars by their suspension therefrom.

There is a widespread use of air driven transporting devices for the transport of plastic and non-plastic containers possessing protruding rings around the area of the neck, typically bottles made from PVC, which require the use of supporting guides on which the protruding collars are placed. They are then moved by a series of fans placed at intervals of about 5 to 7 meters one from the other and designed to blow air in the direction of transportation.

The drawback of this system however, is that the fans set in motion large quantities of air often resulting in the pollution of the containers.

A further drawback is the considerable noise level generated, the elevated power installation and the high levels of energy consumption.

The Italian patent N. 1190535 shows a mechanical apparatus for the forward movement of suspended plastic bottles in which a transporting belt extending over the whole distance of the transport is equipped with a bottle carrying mechanism which attaches itself under the bulge in the neck of the bottle suspending and transporting it through a guiding channel extended along the length of the transport.

The above mentioned document anticipates, for the means providing the forward movement, the use of devices which possess at least one mechanical dragging mechanism which grasps the bottles to be transported and which can be made up of the lateral marginal band of a conveyor or cable transporter or a series of pushing elements acting on the area of the bottle opening above the collar.

The above mentioned devices have not, however, found a practical application in that they pose numerous difficulties above all in curved or uphill tracts of the transport system. In fact the transport systems described envisage a motorised element, typically a belt or strap combined with a further element (for example, a rubber coated belt) which interacts with the collars of the containers. This last element is not coaxial with, or anyway detached from the motorised element so that, in the curved parts of the transport, it describes a different curve from that of the motorised element. It is obvious that this gives rise to numerous operating problems in the setting up, tensing and the calculation of the dimensions of such transporters.

Another conveyor which uses pushing mechanisms is that described in the Italian patent application No. 40029A/90 in which the use is envisaged of the movement of the active branch of a closed chain fitted with lateral elastic protruding pushing elements to one side of the containers and positioned next to a pair of longitudinal guiding elements.

Should there be an accumulation of containers however, as a result of the stopping of the machine down stream, this then generates a high noise level and may cause damage both to the pushing elements and to the containers derived from the sliding force which continues to be exerted by the pushing elements on the containers.

U.S. Pat. No. 3,934,993 discloses a glassware handling and treating equipment in which glass bottles are conveyed along a straight path by means of two parallel endless chains provided with grippers constituting spring fingers that are justaposed and biased toward each other to engage the neck of the bottle, which it is suspended from the endless conveyor chain. This document has the same drawbacks already cited above, because does not consent to convey the bottles on curved paths and may damage the bottles if there is an accidental stop of the bottle flow.

SUMMARY OF THE INVENTION

The purpose of the present invention is to eliminate the above difficulties and in particular to make available a conveyor for the suspended transport of containers with protruding collars which will continue to function in curved and up-hill sections of the transport, thus being capable of the effective replacement of the transportation systems using air as their motive force, with a significant reduction of energy consumption and power installation and without problems arising from the accumulation of containers in the event of a halting of the transport movement.

The said aims are completely fulfilled by the transport device being the subject matter of the present invention, characterised by the descriptions appearing in the claims set out below, and in particular, in that the path followed by the marginal extremity of the pulling elements for the containers is substantially identical (having as well, the same curvature) as that described by the motorised elements of the device, kinetically connected to the said pulling elements and positioned at a different level from the latter.

BRIEF DESCRIPTION OF THE DRAWINGS

These and other characteristics are to be seen more clearly from the following description of two preferred embodiments, the same to be taken purely as non limiting examples, as illustrated in the attached drawings in which:

FIG. 3 illustrates the device in a lateral view substantially perpendicular to that of FIG. 1;

FIG. 4 illustrates a view of the device from above which is partially sectioned along the line A—A in FIG. 3;

FIG. 5 illustrates the device in a view from above in a curved section of the transport device.

DESCRIPTION OF THE PREFERRED EMBODIMENTS

Figure 1:
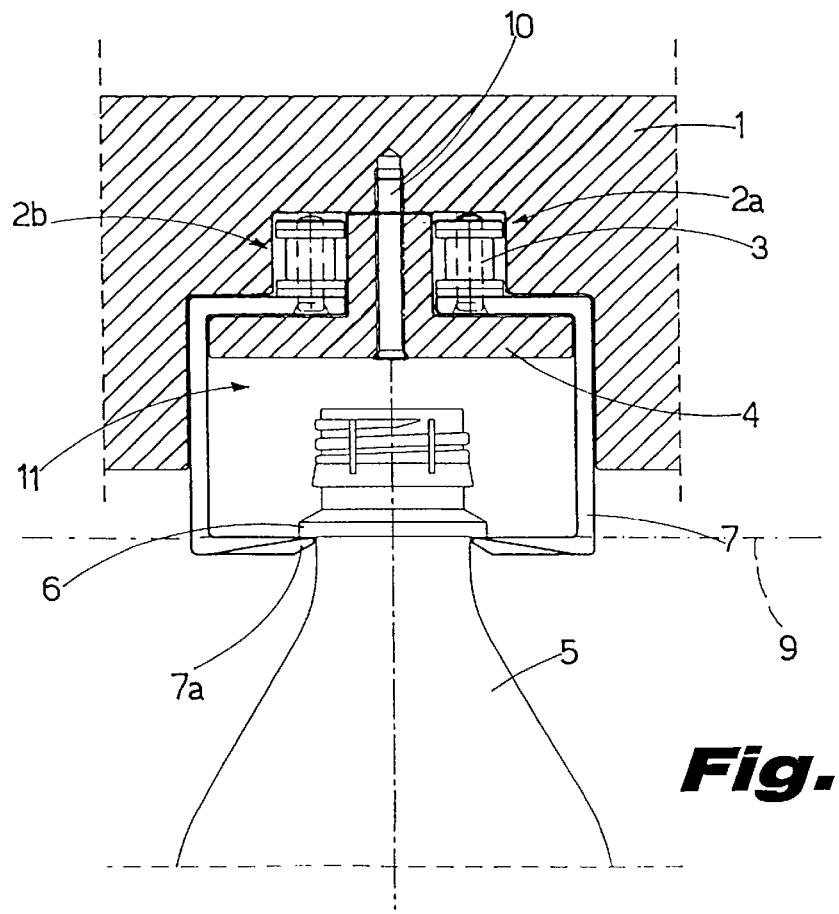
FIGS. 1 and 2 illustrate the device in a view which is partially sectioned along the axis of movement according to two different embodiments.

Referring to FIG. 1, 1 indicates in detail a containing frame or guide for a chain conveyor made up of a pair of roller-type closed chains 2 which move in a plane which is substantially horizontal or with an inclination of less than 20 degrees transversally to the direction of movement, and with even greater inclination along the direction of movement in parts where the transport rises or descends.

Attached by the use of appropriate means 10 which could be, for example, screws, to the guide 1 is a counter-guide 4, for the purpose of supporting the chains and of creating a movement channel for them between the guide and counter-guide.

The roller chains 2a and 2b are moved in the direction indicated by the arrows 8 by a motorization not illustrated because being of known type and which moves the chains by means of for example, pulleys fitted flush to rotating shafts and the chains then being wound round the said pulleys.

Rollers 3, which constitute first mobile elements, are fitted from beneath with supports 7 in the form of a "C", thus making up second elements on whose lower extremities 7a the protruding marginal area of the collar 6 of each container 5 is placed, axial to the central rods of the said rollers. The supports 7 are in fact, anchored from above to the rollers 3 of the chains and are shaped in such a way that their active lower extremity 7a providing support for the container is arranged so that it substantially forms part of the same plane passing through the axes of the corresponding pair of rollers to which the support 7 is connected. Each support 7 is connected to a pair of rollers 3 of a chain. With the support 7 set up in this way, the path followed by the active lower extremitiy 7a functioning as supports and transporting mechanisms, is substantially identical to that of the rollers of the relevant chain, with an identical curvature.

In this way it is possible to eliminate all difficulties arising during the use of the traditional devices in curved sections of the transport in that, with the use of the present device, the path described by the first mobile elements, namely the chains, is completely identical to that of the lower extremities 7a in such curved sections.

To obtain such a result, the plane through which the containers move (the plane described by the motion of the relative collars), marked as 9 on the FIG. 1, has been moved down, positioned below the plane through which the chains move.

The particular arrangement of guide 1 and counter-guide 4 results in a significant increase in the rigidity of the structure of the device and avoids unwanted flexing of the supports 7 and in addition, makes the device easy to adapt to containers with neck and collar of differing diameter. It is easy to envisage the use of a plurality of blocks or spacers to insert into the interior of the partitions 1a of the guide to reduce the width of the central channel 11, and another series of corresponding removable spacers from the counter-guide 4 to reduce its lateral dimension.

Figure 2:
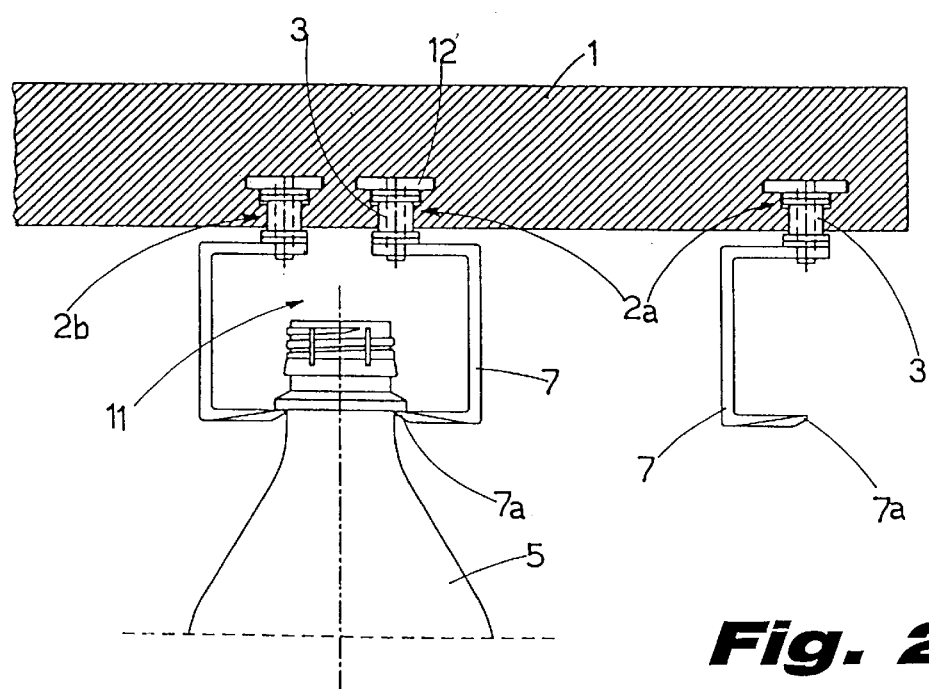

In the variant model illustrated in FIG. 2 there is no counter-guide 4 and the chains are fitted with supporting elements 12 from above, anchored to the rollers and running over a milled seat interior to the guide 1 with the function of sustaining the chain.

According to a further embodiment not illustrated here, it is possible to envisage, for both solutions proposed in FIGS. 1 and 2, the use of a single chain 2 fitted with mobile supports 7 coupled with a fixed supporting guide to the collars on the opposite side.

With particular reference to FIG. 4, the part of the extremity 7a marked 71 is shaped substantially in the form of an isosceles trapezoid while joined to this is a part marked 72, substantially rounded in form.

The said shape of the extremities or appendices 7a of each supporting element 7 creates a unified support surface for the protruding collars of the containers at both sides of the collar, and allows the preservation of the level continuity of such a surface even in curved sections where the continuity is maintained thanks to the partial overlap of the trapezoidal part of a support with the rounded part of the support immediately following.

The part in the form of an isosceles trapezoid 71 has its longer side facing the central channel 11 through which the containers 5 are moved.

It is obvious that the chain conveyors 2 can be replaced by other types of conveyors, for example driven by belts or cables to which supports have been attached in such a way as to present an active supporting extremity for the container, describing a substantially identical path in curved sections to, and with the same curvature as, that described by the initiating driving element of the conveyor, whether belt or cable.

The term "substantially identical" is used to describe a path of the extremities 7a which is co-axial to that of the transport, or having the same curvature, at least with lateral play of less than 20 mm.

What is claimed:

1. A device for the suspended transport of containers of a type having protruding collars comprising:
   at least one guide fixed with a support;
   one or more first mobile elements in said at least one guide whose movement is powered through a first movement plane by a driving motor;
   second elements associated to and kinetically connected to said first mobile elements, wherein each said second element is shaped substantially in the form of a "C", one extremity of which is fixed to at least one said first mobile element and the other is a marginal extremity which is a resting surface for contact with the protruding collar of a container; and
   wherein the extremity of each said second element acting as a supporting surface for the protruding collar of a container is an appendix which partially overlaps an adjacent appendix of at least one other said second element to form, together with said at least one other appendix, a single and continuous supporting surface for the collar of a container both in straight and curved movement of the transport of the containers.

2. A device according to claim 1, wherein said first mobile elements comprise at least one closed chain of rollers and said second elements are arranged with the said marginal extremity thereof on which rests the collar of the containers shares substantially the same plane as that passing through the axles of a pair of said rollers which sustain the said marginal area of a said second element.

3. A device according to claim 2, wherein the dimensions of the possible movement of the extremities of said second elements relative to the axles of their respective rollers of the chain does not exceed 20 mm.

4. A device for the suspended transport of containers of a type having protruding collars comprising:
   at least one guide fixed with a support;
   one or more first mobile elements in said at least one guide whose movement is powered through a first movement plane by a driving motor;
   second elements associated to and kinetically connected to said first mobile elements and having a marginal extremity on which each container rests by contact with the lateral area of its protruding collar;
   said second elements associated to said first mobile elements such that said first mobile elements and said marginal extremity of said second elements on which the collar of the container rests are co-axially located on a same vertical plane passing through axles of said first mobile elements and follow substantially similar paths on two different curved movement planes; and
   a counter-guide for the support of said first mobile elements and of said second elements to accommodate containers with necks having collars of differing distances from the tops of the containers.

5. A device according to claim 4, wherein each second element is shaped substantially in the form of a "C", one horizontal extremity of which is fixed to at least one said first element and the other horizontal extremity is said marginal extremity which is a resting surface for the protruding collar of a container.

6. A device according to claim 1, wherein a said appendix comprises a substantially isosceles trapezoid with its longer base turned towards the container, said trapezoid having two blunted parts partially overlapping with said at least one other adjacent appendix.

7. A device as in claim 4 wherein said guide comprises a pair of generally parallel channels, said first elements comprising rollers in each of said parallel channels.

* * * * *